April 4, 1961 O. LOEBICH ET AL 2,978,363

INSULATED ELECTRICAL CONDUCTORS

Filed Oct. 11, 1956

INVENTORS
OTTO LOEBICH,
ALOIS SEIDL,

BY Bailey, Stephens & Huettig
ATTORNEYS

United States Patent Office 2,978,363
Patented Apr. 4, 1961

2,978,363

INSULATED ELECTRICAL CONDUCTORS

Otto Loebich, Pforzheim, and Alois Seidl, Lam, Lower Bavaria, Germany, assignors to Deutsche Gold- und Silber-Scheideanstalt vormals Roessler, Frankfurt am Main, Germany Filed Oct. 11, 1956, Ser. No. 615,232

Claims priority, application Germany Oct. 12, 1955

4 Claims. (Cl. 117—215)

Figure 1:
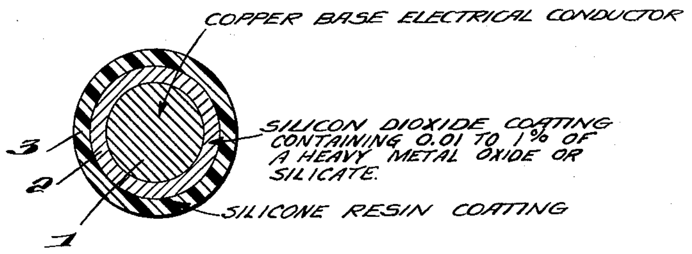

The present invention relates to electrical conductors of copper or copper alloys of elongated shape, such as wires or rods, which are provided with insulating silicon dioxide containing coatings and a process of producing such insulated conductors. Furthermore, the invention relates to such electrical conductors which in addition to the heat resistant silicon dioxide containing coating are provided with an insulating covering layer of silicone resins or of glass fibers which are spun thereover.

Synthetic resins or lacquer coatings of most varied types have been employed for the insulation of copper or copper alloy wires or rods. Such insulation, however, in general did not withstand high temperature stresses. The quality of the insulation used in the production of electric motors and transformers is of particular significance as the load capacity thereof to a great extent depends upon how high a temperature can be attained in the conductive parts thereof, and especially the windings, before breakdown occurs. Previously wires insulated with shellac have generally been used for such windings, but shellac is extraordinarily sensitive to rises in temperature in the windings. Consequently, attempts have been made to replace shellac with heat resistant synthetic resins which have become available, for example, the silicone resins, coatings of which can withstand temperatures up to about 200° C. without far reaching deterioration. Aside from the fact that such silicone coatings do not adhere sufficiently firmly upon heating of the wires to 200° C. as already at such temperatures scaling of the copper occurs which tends to loosen the bond between the copper wire and the coating, it was not practically possible to employ such coatings on wires subjected to temperatures above 200° C.

According to the invention, it was found that for many purposes the disadvantages still present with silicone resin insulated wires could be overcome by insulating wires, rods or other elongated electric conductors with a surface coating which essentially consists of silicon dioxide and contains certain foreign metals in quantities between 0.01 and 1%. The foreign metals which come into consideration according to the invention are such heavy metals which have a density of over 5 g./cc. and belong to the group of arsenic, cerium, iron, cobalt, copper and vanadium. It is immaterial whether such foreign metals are present as such in the silicon dioxide coating or in the form of their oxides or silicates. Also, it is not absolutely necessary that the foreign metal content is uniform throughout the thickness of the coating. The foreign metal content, for example, can be concentrated at the boundary surface between the silicon dioxide coating and the conductor therebetween, that is, the copper wire or copper rod.

Conductors of copper or copper alloys, such as wires or rods, which are provided with the silicon dioxide coating according to the invention are effectively protected against scaling at elevated temperatures even though the thickness of such coating in most instances does not exceed 1$\mu$. Furthermore, such coating when applied in the manner described below is sufficiently elastic that the coated wire can be bent or twisted without damage to the coating. Furthermore, when such silicon dioxide coating is used as a base for silicone coatings or spun glass fiber insulating coatings, it hinders the loosening of the silicone coatings even at higher temperatures and promotes adherence of the glass fiber insulation.

The insulating coating according to the invention is applied to the conductor by applying an alkali metal silicate solution, preferably, by dipping, and subsequently drying the adhering liquid by heating the temperature up to 350° C., advantageously up to 250° C., to produce a thin uniform coating. Expediently such drying is effected in contact with air.

It is important for the properties, the covering capacity and adherence of the coating that a regulated flocculation from the solution occurs on intentionally provided flocculation centers. Such flocculation centers, for example, can be metal ions, which can be provided in the coating in various manners. However, under some circumstances it suffices when the accelerated and regulated flocculation of the silicon dioxide is brought about by contact of the coating solution with the fine glass fibers spun around the conductor.

According to a preferred modification of the invention, either the composition of alkali metal silicate solution is so selected that it attacks the metal of the conductor to which it is applied or to promote such attack by the heat treatment at elevated temperatures up to 350° C. Furthermore, salts of the foreign metals can be added to the alkali metal silicate solution in such quantities, that the foreign metal content of the coating after drying lies between 0.01 and 1%. This procedure is of advantage as one does not have to depend upon such metals as can be delivered from the conductor base.

According to a further modification, preliminary scaling or oxidation of the uncoated conductor can be effected by heating such conductor in air to temperatures between 100 and 200° C. before application of the alkali metal silicate solution. Such heat treatment provides a coating on the conductors from which the subsequently applied alkali metal silicate solution can easily take up copper in the form of its oxide or silicate. Instead it is also possible to add ammonium salts or hypochlorites, such as alkali meta hypochlorites, to the alkali metal silicate solutions which attack the surface of the metal conductor and to a certain extent etch it so that the compounds produced easily enter the alkali metal silicate solution and the silicon dioxide coating produced upon drying such solution. Consequently, it is advantageous to introduce the foreign metals into the alkali metal silicate solution in the form of metal ammonium complexes, such as, for example, cerium-ammonium-nitrate or copper tetra amino nitrate.

Wires or rods which are provided with an insulating coating or intermediate coating according to the invention are extremely resistant to scaling and can be heated to temperatures up to 400° C. without any essential change in the copper surface. Furthermore, the foreign metal containing silicon dioxide coatings produced according to the invention provide an excellent bonding base for insulating coatings of heat resistant resins or lacquers.

Figure 2:
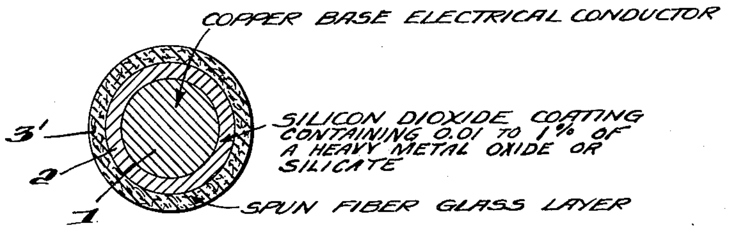

Fig. 1 shows a cross-section of a copper base electrical conductor provided with an insulating coating according to the invention; and Fig. 2 shows a cross-section of another insulated copper base electrical conductor according to the invention.

Referring to the drawings the copper base electrical conductor 1 is provided with a coating 2 of silicon dioxide containing a small quantity of an oxide or silicate of a heavy metal, which coating is in turn covered by a silicone resin coating 3 as shown in Fig. 1 or a spun fiber glass layer 3' as shown in Fig. 2.

Several modifications of the invention are illustrated in the following examples:

*Example 1*

A copper wire was degreased galvanically, washed and then dried in air and thereafter drawn through a solution having a 5.7% solids content which is of the following composition:

100 cc. water glass ($d=1.27$, $Na_2O:SiO_2=1:4.3$)
380 cc. water
1 g. cobalt nitrate The wire was drawn through the bath at a rate at which about 1 milligram of solution per cm.$^2$ of wire surface adhered to the wire. The thus coated wire was then dried in air at 100° C. The drying temperature employed depends upon the time available therefore and actually can vary between room temperature and 350° C. If the coating thus obtained is not sufficiently thick the procedure may be repeated one or more times using the same solution and about the same quantity of solution. The coated wire was then lacquered with a silicone resin and employed for the production of an electric motor winding which was then impregnated with the silicone resin.

*Example 2*

A bright copper wire was degreased, rinsed and dried and then heated in air at 200° C. After cooling off, it was drawn through a solution of 100 cc. water glass of a density of 1.31 ($Na_2O:SiO_2=1:4.0$) in 500 cc. of water which corresponds to a 4.5% solids content. The wire was drawn through such solution at a rate at which about one milligram of solution per cm.$^2$ of wire surface adhered to the wire. During the subsequent drying of the thus coated wire fiber glass was spun thereabout and after application of the spun fiber glass the wire was again passed through the solution and then heated to 250° C.

*Example 3*

Copper rods of a squirrel cage motor were etched in an acid solution, rinsed with water and dipped for several seconds in a solution of 100 cc. water glass ($d=1.27$, $Na_2O:SiO_2=1:4.3$) and 1.2 g. cerium nitrate in 340 cc. of water. The solids content of such solution was 6.2%. After dipping, the rods were dried in air at room temperature and then treated for 2 hours at 220° C. in an oven. The thus coated rods were protected against scaling, against tarnishing during storage and against corrosion in moist, acid or salt water fog containing atmospheres. They can be inserted in the slots of the squirrel cage motor in a customary manner and their ends can be short circuited with soldered copper wires or rings. The silicon dioxide containing protective coating did not need to be removed before the soldering. The coating produced according to the invention insulates the copper rods against metallic contact with the edge surfaces of the slots in the silicon iron sheet of the core.

*Example 4*

A silicate solution was prepared by mixing 10 cc. of a water glass solution ($d=1.33$) with 10 cc. of $H_2O$, 9 cc. of an aqueous sodium arsenate solution containing 0.2 gram of arsenic per liter and 5 cc. of an aqueous copper sulfate solution containing 0.2 gram of copper per liter to which 0.5 gram of potassium sodium tartarate had been added to render such copper sulfate solution stable to alkali. A bright copper wire was degreased, rinsed and dried and then it was drawn through the solution at a rate at which about 1 mg. of solution/cm.$^2$ of bright surface adhered to the wire. The coating then was dried by heating the wire to a temperature of 220° C.

We claim:

1. A heat resistant insulated elongated electrical copper base electrical conductor with a surface coating which essentially consists of silicon dioxide coating containing uniformly distributed therein 0.01 to 1% of at least one metal having a density over 5 grams per cc. selected from the group consisting of arsenic, cerium, iron, cobalt, copper and vanadium in the form of a compound selected from the group consisting of oxides and silicates of such metal.

2. A heat resistant insulated elongated electrical conductor according to claim 1 which in addition is coated with a silicone resin.

3. A heat resistant insulated elongated electrical conductor according to claim 1 which in addition has a spun fiber glass layer thereover.

4. A process for the production of a heat resistant insulated elongated copper base electrical conductor which essentially consists of applying a coating of an aqueous alkali metal silicate solution containing an alkali soluble compound of a metal selected from the group consisting of arsenic, cerium, iron, cobalt, copper and vanadium to the surface of an elongated copper base electrical conductor and drying such coating at a temperature up to 350° C. to produce a firmly adhering thin coating on the surface of such electrical conductor the quantity of such alkali soluble compound of the metal being such as to provide 0.01 to 1% of such metal in the dried coating.

References Cited in the file of this patent

UNITED STATES PATENTS

| | | |
|---|---|---|
| 1,874,542 | Kaul | Aug. 30, 1932 |
| 2,313,410 | Walther | Mar. 9, 1943 |
| 2,626,223 | Sattler et al. | Jan. 20, 1953 |
| 2,639,247 | Squier | May 19, 1953 |
| 2,664,405 | Andersen | Dec. 29, 1953 |
| 2,691,694 | Young | Oct. 12, 1954 |

FOREIGN PATENTS

| | | |
|---|---|---|
| 850,633 | Germany | Sept. 25, 1952 |

OTHER REFERENCES

Ceramic Age, vol. 55, issue 4, page 236, April 1950.